(No Model.)
C. C. MORRIS.
FAUCET AND AUTOMATIC GAS VALVE.
No. 366,237. Patented July 12, 1887.
FIG. 1.
FIG. 3.
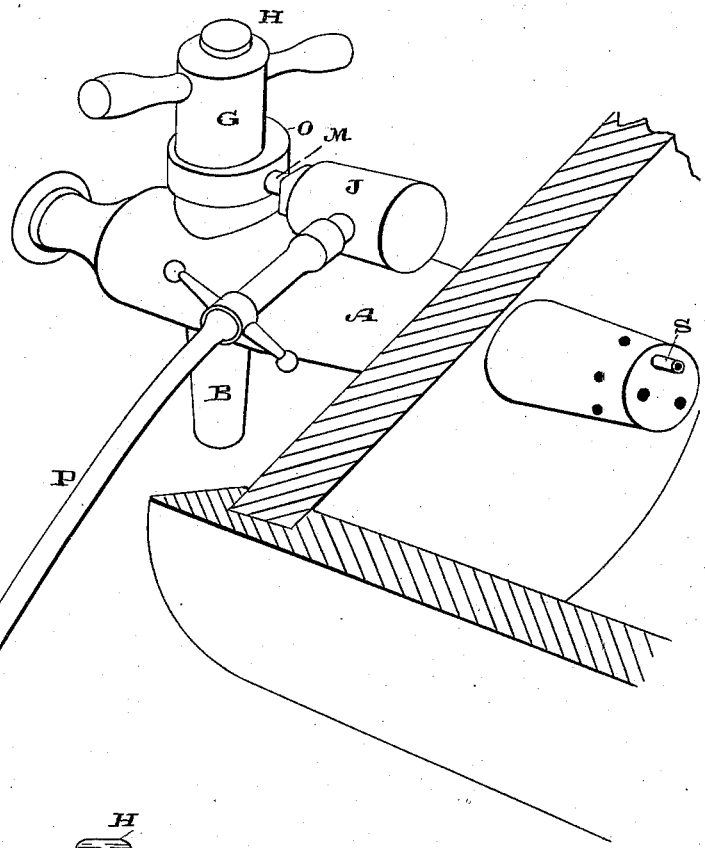
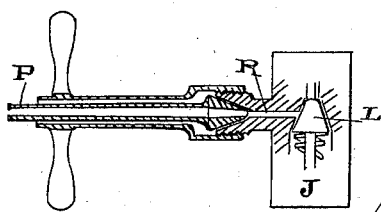
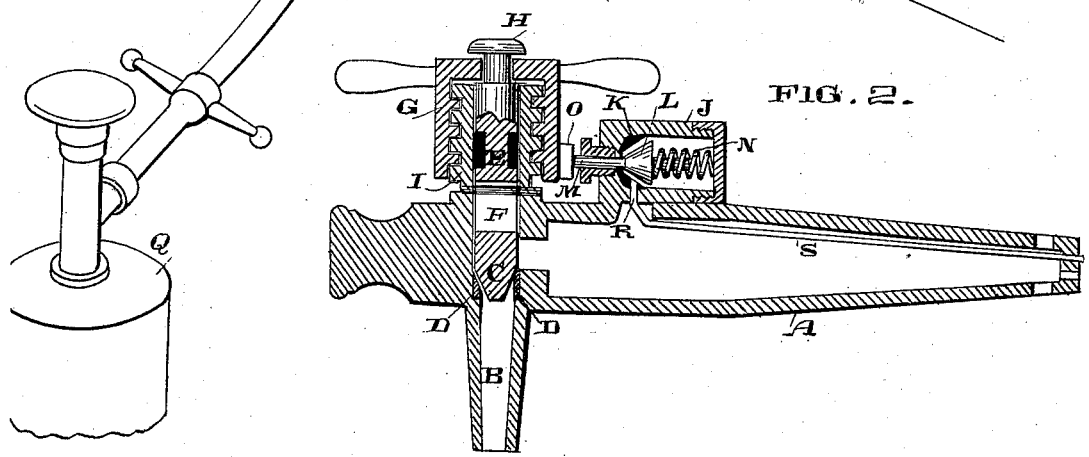
FIG. 2.
Witnesses,
Geo. H. Strong
J. H. Nourse
Inventor,
Chas. C. Morris
By Dewey & Co,
atty

UNITED STATES PATENT OFFICE.

CHARLES CHAUNCEY MORRIS, OF SAN FRANCISCO, CALIFORNIA.

FAUCET AND AUTOMATIC GAS-VALVE.

SPECIFICATION forming part of Letters Patent No. 366,237, dated July 12, 1887.

Application filed November 27, 1886. Serial No. 220,093. (No model.)

*To all whom it may concern:*

Be it known that I, CHARLES CHAUNCEY MORRIS, of the city and county of San Francisco, State of California, have invented an Improvement in Faucets and Automatic Gas-Valves; and I hereby declare the following to be a full, clear, and exact description of the same.

My invention relates to a faucet and an automatic valve so actuated that by the opening of the faucet this valve is opened to admit carbonic gas and allow it to flow backward through the faucet and into the cask at the same time while beer is being drawn out by the opening of the faucet.

Referring to the accompanying drawings for a more complete explanation of my invention, Figure 1 is an exterior view of the faucet. Fig. 2 is a longitudinal vertical section taken through the body of the faucet, the tap, and the automatic valve-gear. Fig. 3 shows manner of coupling pipe to the chamber.

It is well known that by the introduction of carbonic-acid gas into beer within the cask it is greatly improved, and the pressure is at the same time maintained until the beer can all be drawn out from the cask; and my improvement is designed to provide a means for introducing the gas simultaneously with the withdrawal of the beer, so that the pressure is maintained at the proper point and the beer preserved in all its sharpness until the whole has been drawn off.

A is the faucet-body, which is fitted to be introduced into the cask in the ordinary or any suitable manner. This faucet has the usual longitudinal hole or opening and the vertical transverse opening or passage connecting with its outer end, as shown at B, so as to discharge the beer from the cask from time to time, as may be desired.

C is the valve by which this opening is closed, and it is made, as shown in the present case, of a conical form and fitting upon a seat, D, of tin or other soft metal, upon which it will make a tight joint when closed. This valve is formed or secured at the lower end of a vertically-moving stem, E, which is guided by means of a slot and screw, F, so that it is allowed to rise and fall without turning, as it is desirable not to turn the valve upon the seat, as the latter would thus be caused to wear very rapidly, and a perfectly-tight joint can be made by simply pressing it down upon the seat. The head of the stem E passes through the cap G, to which the turning lever or handle is fixed, and the spindle has a neck with a head, H, at the outside and above the cap G, so that when the latter is raised it will act against the head H, and thus raise the spindle and valve vertically, the latter not turning by reason of the guiding pin and slot F, as before described. A groove is made in the interior of the sleeve I, so that suitable packing may be put in around the stem E, to prevent leakage at this point. The faucet-cap G is screw-threaded, and these threads engage with other threads upon the exterior of the sleeve I, which projects upwardly from the outer end of the faucet and in line with the discharge-passage B, which is below the faucet, so that when the cap is turned around by its projecting arms or handles it travels up the screw-thread upon I, so as to raise and open the valve, and is moved down upon it when desirable to close the latter.

J is a casing secured upon the top of the faucet-body A, having a longitudinal chamber within it with a conical soft-metal seat, K, which is closed by a correspondingly-shaped valve, L, fixed to the horizontal spindle within the casing J. A spiral spring, N, within the casing acts to close the valve by pressing upon its back, and the stem M passes out through a suitable stuffing-box at that end of the casing nearest the cap G of the spigot. Upon one side of the cap G is formed a projecting cam, O, which is in line with the end of the valve-spindle M, and when the cap G is turned around, so that this cam comes in contact with the end of the spindle M, it forces the valve L back from the seat K. Into the side of the chamber J a pipe, P, is led from a reservoir, Q, containing carbonic-acid gas properly prepared and under such pressure as may be desired. Suitable connections are made, so that a tight joint may be formed when the pipe is connected, these joints being preferably made, as I have before described, with soft-metal faces or seats to prevent leakage, and this pipe or passage opens directly through the conical side of the valve-seat K, so that the pressure of the gas is admitted to the side of the valve at this point.

A passage, R, is made in the same plane with this inlet-passage, also opening against the side of the valve at a point a little distance from the inlet-passage, and this passage R connects with a pipe or passage, S, which extends through the interior or through the body of the faucet A, so that its inner end opens inside the cask, and when the valve L has been opened the gas which is admitted through the pipe P will pass directly through the passages R and S into the interior of the cask.

The operation of this device will then be as follows: Whenever beer is to be drawn, the cap G is turned, thus opening the valve C and allowing the beer to flow out through the passage and discharge-nozzle B. At the same time the cam O upon the side of the cap is brought into contact with the end of the valve-stem M, thus forcing it back and opening the valve L, so that communication is opened between the gas-inlet passage P and the passages R and S, and the gas is thus allowed to flow into the cask and become absorbed by the beer, the surplus acting to produce the proper or desired pressure. When the faucet is closed so as to stop the flow of the liquid, the gas-inlet will also be closed by the action of the spring N, as before described, and I am enabled to supply fresh gas every time the beer is withdrawn, thus keeping it in good condition until the cask has been entirely emptied.

By employing the independent soft-metal seats for the valves I am enabled to use cast-steel, iron, or other hard metal in which a ground joint could not be made sufficiently tight, and the faucet is thus much cheaper and stronger.

Having thus described my invention, what I claim as new, and desire to secure by Letters Patent, is—

1. The combination, with the faucet-body having the discharge-passage and screw-threaded extension I, of a screw-threaded cap engaging the extension, a non-rotating vertically-moving valve operated by said cap, and having a threadless stem passing through both the extension and cap, and a soft-metal seat for said valve, substantially as herein described.

2. An improved faucet comprising a main body and a discharge, a vertically-moving threadless valve, a screw-cap by which it is actuated, a supplemental chamber having a valve moving within it and actuated by a cam on the screw-cap, a pipe leading from said chamber to the interior of the cask, and another pipe leading to a gas-reservoir, substantially as herein described.

In witness whereof I have hereunto set my hand.

CHARLES CHAUNCEY MORRIS.

Witnesses:
   T. MORRIS,
   ANDREW J. COFFEE.